June 17, 1958
A. J. SHEKTER
2,838,971
FACE PLATES FOR VISE JAWS
Filed Oct. 13, 1955
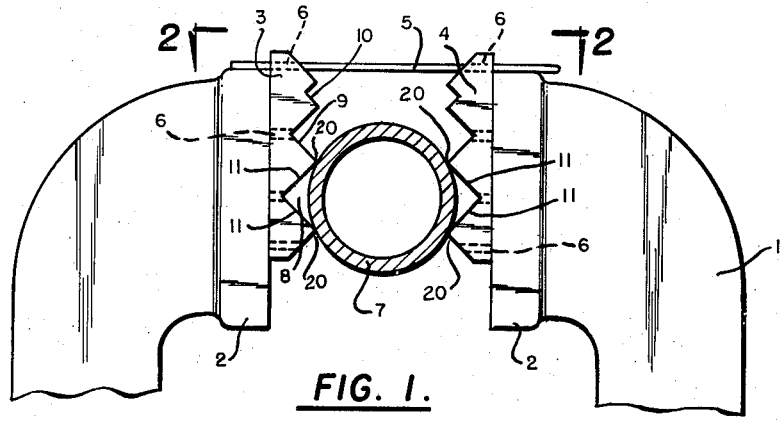
FIG. 1.
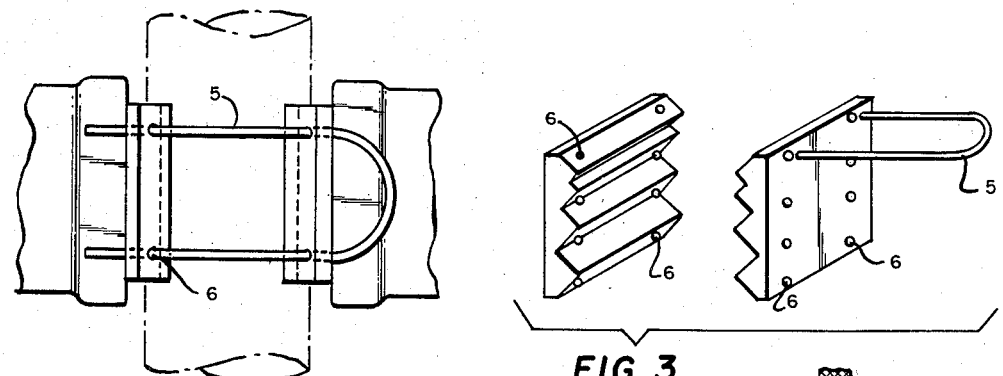
FIG. 2.
FIG. 3.
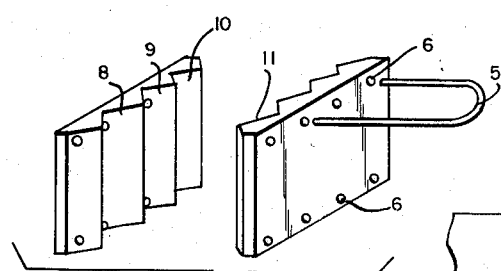
FIG. 4.
FIG. 5.
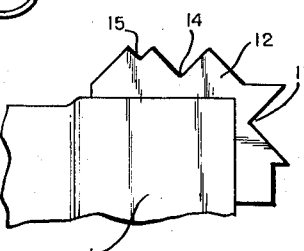
FIG. 6.
INVENTOR
ABRAHAM J. SHEKTER
BY John Boyle
ATTORNEY United States Patent Office 2,838,971
Patented June 17, 1958

2,838,971

FACE PLATES FOR VISE JAWS

Abraham J. Shekter, Coral Gables, Fla.

Application October 13, 1955, Serial No. 540,314

2 Claims. (Cl. 81—39)

My invention relates to a clamp attachment for a vise for clamping a tube, rod or similar object in a horizontal or vertical position in the vise.

The clamp is made of two similar blocks that are positioned and held between the jaws of the vise. By changing the position of the clamp on the jaws of the vise the tube or rod can be clamped in a vertical or horizontal position.

In whatever position the tube or rod is clamped or suspended in the vise, the pressure exerted on each block of the clamp by closing the jaws of the vise is transmitted equally by both blocks of the clamp to the tube or rod, thus preventing bending or distortion of the tube or rod when clamped.

Reference is made to the drawing for a more complete disclosure of the invention, and in which:

Fig. 1 is an elevation of the preferred form of clamp applied to the jaws of a vise, a pipe being shown in vertical transverse section;

Fig. 2 is a fragmentary plan view of Fig. 1;

Fig. 3 is an exploded view of the clamp arranged to hold a tube or pipe in a horizontal position;

Fig. 4 is an exploded view of the clamp arranged to hold a tube or pipe in a vertical position;

Fig. 5 shows the clamping block of Figs. 1–4 when used as a bed for drilling a pipe.

Figure 6 shows a modified form of clamping block.

Between jaws 2 of a conventional adjustable screw vise 1 are supported two similar clamping blocks 3 and 4 by means of a U-shaped pin 5 that engages opposed holes 6 in the clamping blocks and rests on top of the jaws 2 to suspend the clamping blocks in operative position.

When a pipe 7 is to be clamped in horizontal position, as in Figs. 1 and 2, the clamping blocks can be adjusted vertically by inserting the pin 5 in any one of the series of holes 6 to vertically adjust the clamping blocks between the jaws of the vise and so position them as to get the maximum clamping and wedging pressure on the pipe. When the pipe 7 is to be clamped in a vertical position, the pin 5 will be inserted in any two opposed holes of the clamping blocks, as shown in Fig. 4.

The faces of each opposed clamping block are identical. As shown in Fig. 1, there are three notches 8, 9 and 10 to fit different sizes of pipes. An apex 20 of each clamping block is in the same horizontal plane or line as the opposing apex. Sides 11 of each notch are of equal length and the angle between the arms is equal. This produces two points of pressure on one clamping block in line with two opposing points of pressure on the opposite clamping block, resulting in maximum equal pressure at four points on the pipe. If the points of pressure are not in line, which would occur if the opposed arms 11 of the notches 8 were unequal in length or when the angle of the notches are not equal, this would cause squeezing or distortion of the pipe.

In the modification of Fig. 6, a clamping member 12 is provided with notches 13, 14 and 15 and can be used for the same purpose as the preferred form of Figs. 1–4, there being a corresponding clamping block supported on each opposed jaw 2 of the vise. By reversing the position of the clamping block 12, the notches 14 and 15 can be made available for clamping in the same manner as shown with notch 13.

In addition to its utility as a clamp in a vise, a clamping block 3 can be used as a bed for the pipe 7, as shown in Fig. 5, when placed flat on the bed of a drill press when drilling with a drill 16, the angular support holding the round pipe in secure position.

From the above description of the preferred form, it will be seen that I provide a clamp made of two similar parts that can be held suspended in a vise by a U-shaped pin that passes through aligned holes in each half of the clamp. Four of these holes are provided near the longer sides of each block so that lines joining any pair of opposite holes will lie parallel to the shorter sides of each block. By putting the U pin in any selected pair of said opposite holes, the clamp can be suspended at a desired level when placed in the vise, the arms of the U pin resting on the jaws of the vise. In that position, various diameters of round tubing or rod can be clamped in the vise, using the various angular channels in the clamp to fit the tubing. In that position the clamped tube or rod runs parallel to the jaws of the vise and is in a horizontal position. When it is desired to clamp the tube or rod in a vertical position, the U pin is inserted in two of the holes in either of the two rows that run parallel to the longer sides of the clamp so that the blocks can be supported on the jaws of a vise in a position in which longitudinal axes of the notches 8, 9 and 10 extend vertically.

In both positions, the tube or rod is clamped and suspended in the vise. The pressure exerted on the base of each half of the clamp, by tightening the vise, is transmitted equally by both halves of the clamp to the tube or rod, thus preventing the bending, squeezing, shearing or distortion of the object clamped, the pressure being transmitted equally on the object at four points of the clamp.

The advantage of using a suspension pin as compared with a lip on each block of the clamp is that I can suspend and position the clamp at different levels in the vise and in this way I secure direct pressure of the jaw of the vise on that particular notch of the clamp holding the tube or rod.

By providing various size notches in the same block for accommodating different sizes of tubes, I eliminate the necessity of changing blocks that have only one notch.

In order to secure the maximum pressure on the clamp, the apex of the notch in the block should be in the highest pressure area. Since the depth of vise-jaw faces vary, the level of maximum clamping pressure may also vary from one vise to another. By placing appropriately spaced holes near the longer sides of each of the blocks, the U pin can be inserted through selected pairs of these holes to position the notch at the desired level in the vise. By turning the blocks as shown in Fig. 1 upside down, the notch 8 could be placed in a pressure area in the event that the insufficient depth of the face of the vise otherwise prevented it.

In the design of a clamp of this type, consideration must be given to the distance between the jaws and whatever mechanism is situated below the jaws for operating the vise. The presence of spaced holes in the blocks and the use of removable pins serve not only to position the blocks at any desired level but also permit the blocks to be mounted at a level that will clear whatever operating mechanism underlies the jaws.

The U-pin adjustment of the blocks provides a support for the blocks on the jaws of the vise at the desired level of the notches; provides adjustment of the blocks to the desired level of the notches; and provides clearance of the bottom of the blocks as they hang over the operating mechanism of the vise.

The contacting surface of the notches may be lined with friction material to avoid slipping, especially when threading a tube or rod.

Having thus described my invention, what I claim as new and desire to secure by Letters Patent is:

1. A clamping attachment for a vise having jaws with opposed faces comprising spaced blocks having opposed faces, the faces of the blocks being provided with parallel notches, means for supporting the blocks on such vise jaws in a position where the notches are vertical in one position and horizontal in another position, the blocks being provided with a plurality of transverse parallel spaced holes, and said means comprising a pin having spaced arms for traversing the holes in the blocks and resting on top of such vise jaws.

2. A clamping attachment for a vise having jaws with opposed faces comprising spaced blocks having opposed faces, the faces of the blocks being provided with parallel notches, each block having a plurality of spaced holes extending transversely of the block, a pin having spaced arms for traversing corresponding holes in the blocks and adapted to rest on top of such vise jaws for supporting the blocks between such vise jaws in a plurality of adjusted positions.

References Cited in the file of this patent

UNITED STATES PATENTS

| | | |
|---|---|---|
| 791,374 | Shepardson | May 30, 1905 |
| 858,043 | Watkins | June 25, 1907 |
| 1,274,774 | Ponton | Aug. 6, 1918 |
| 1,818,501 | Odin | Aug. 11, 1931 |
| 2,115,652 | Stahl | Apr. 26, 1938 |
| 2,490,371 | Norton | Dec. 6, 1949 |